Feb. 6, 1940.　　　　L. A. LALLEMENT　　　　2,189,586
BOTTLE WASHER AND STERILIZER
Filed April 16, 1936　　　9 Sheets-Sheet 1
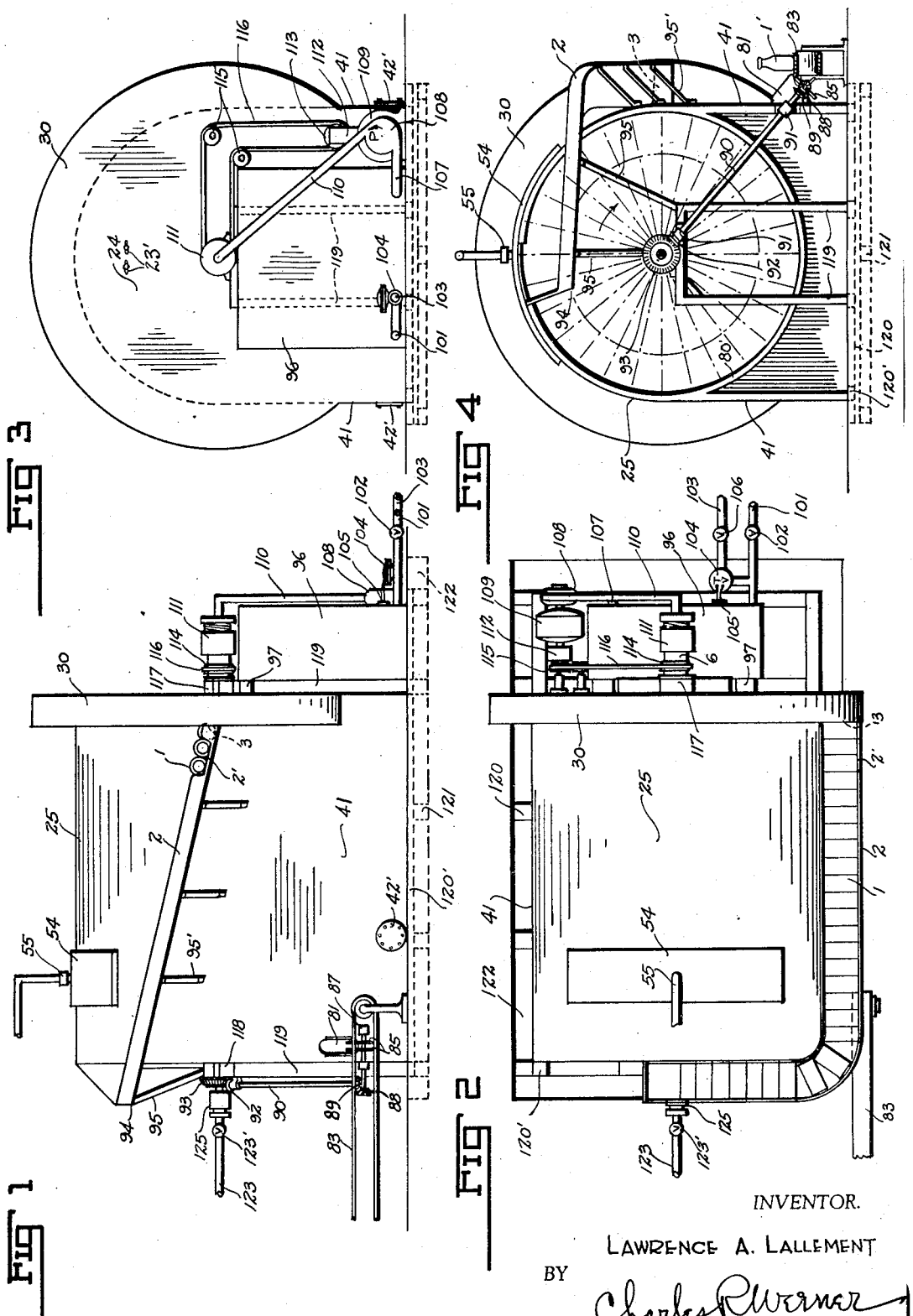
INVENTOR.
LAWRENCE A. LALLEMENT
BY Charles R. Werner
ATTORNEY.

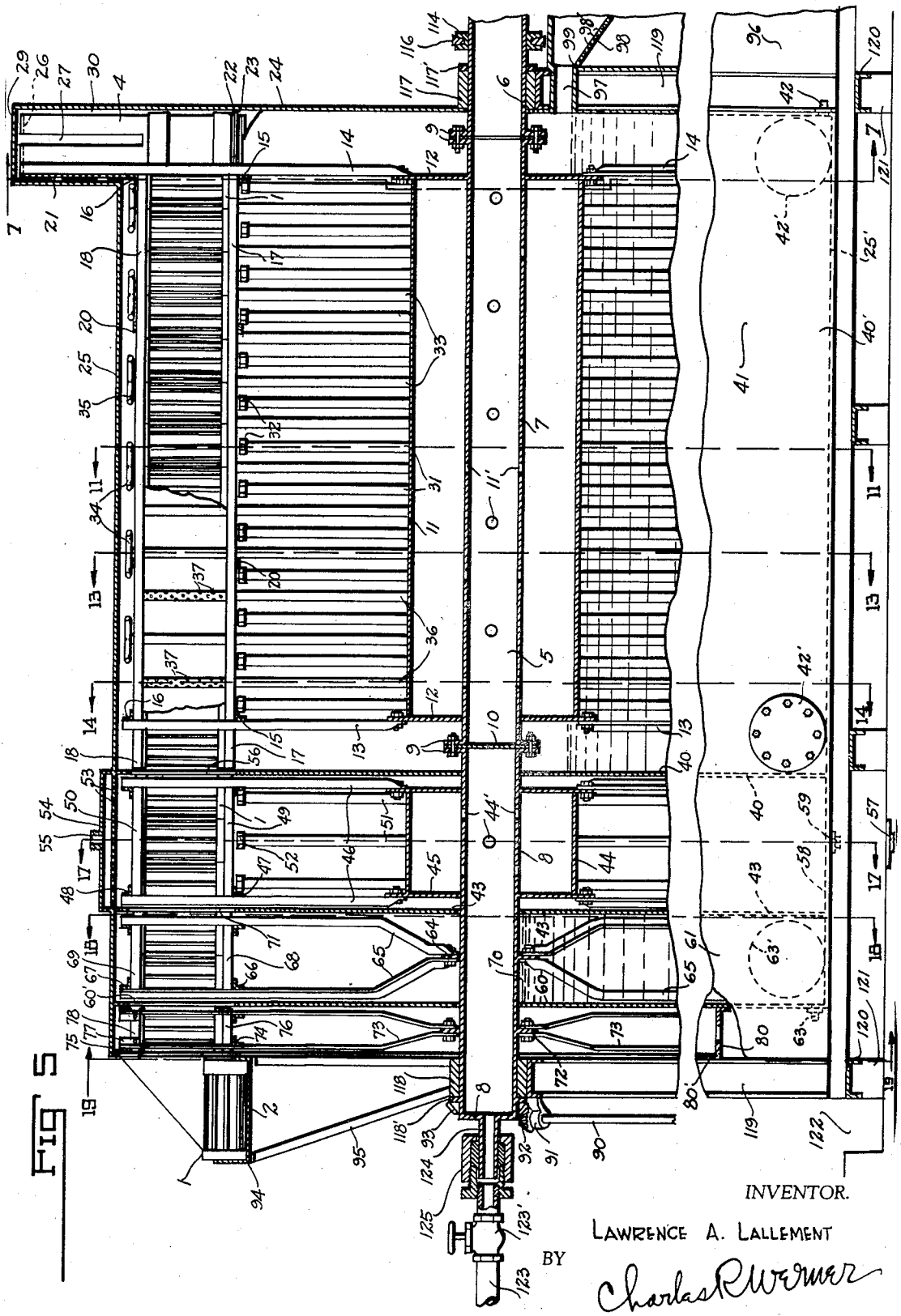

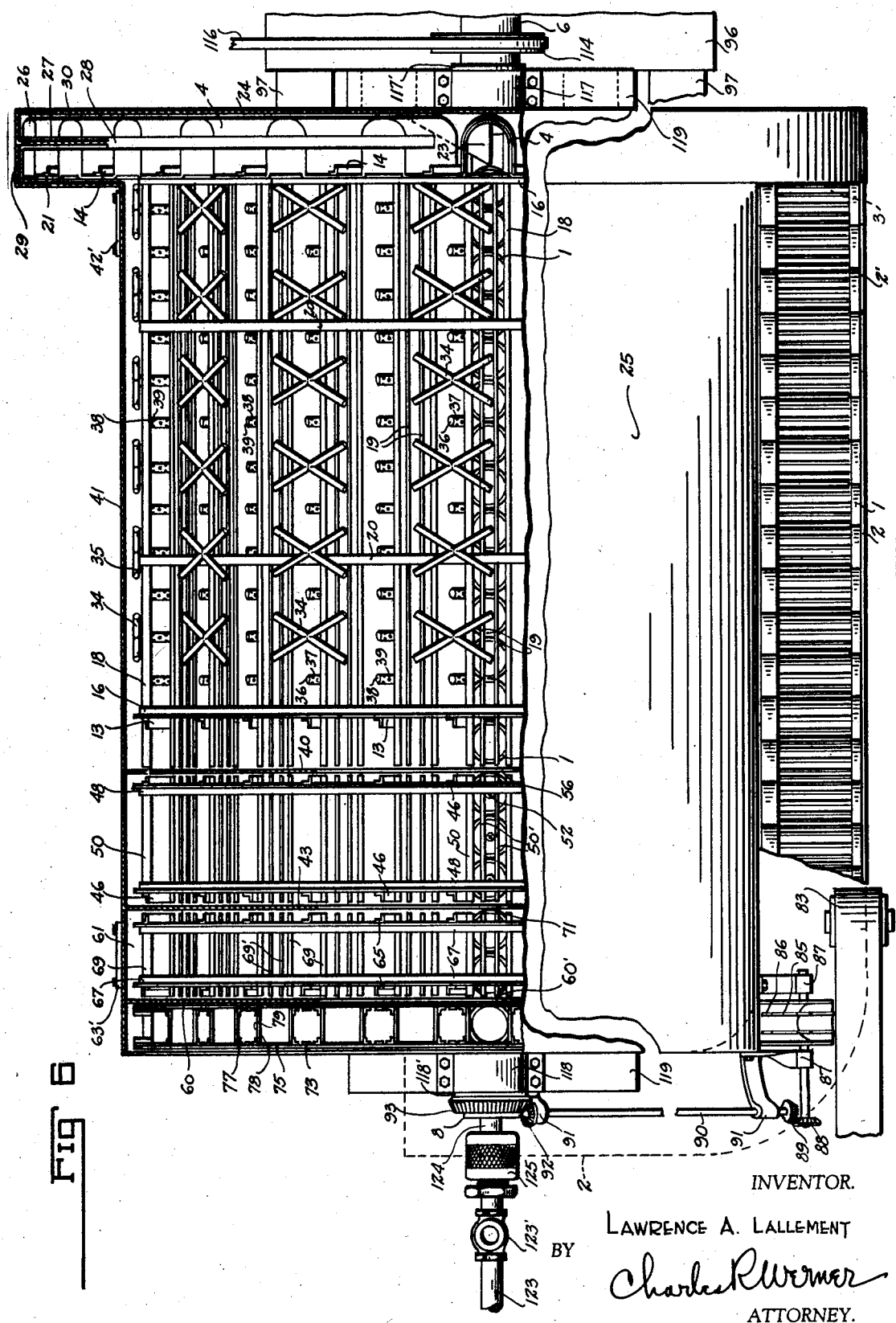

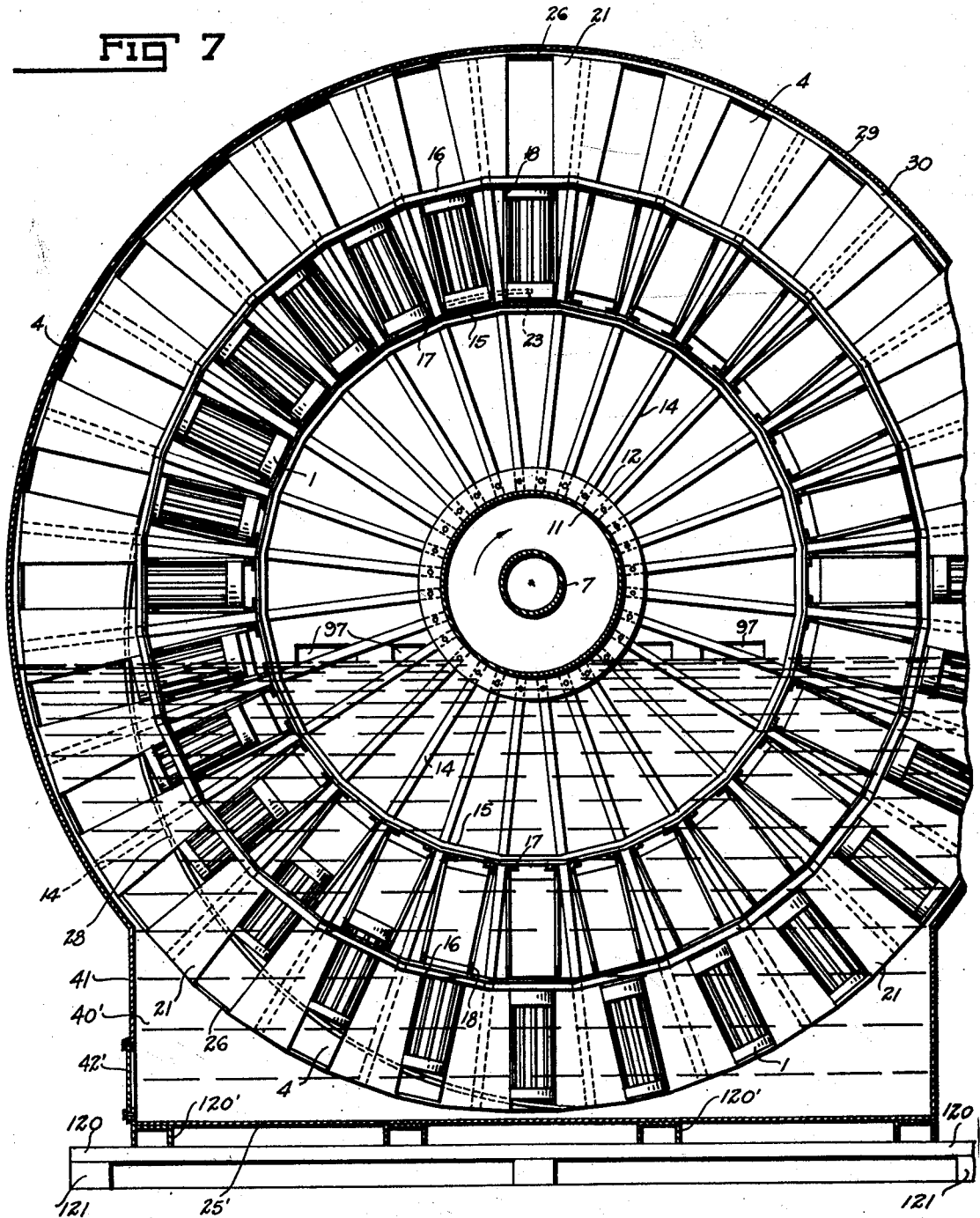

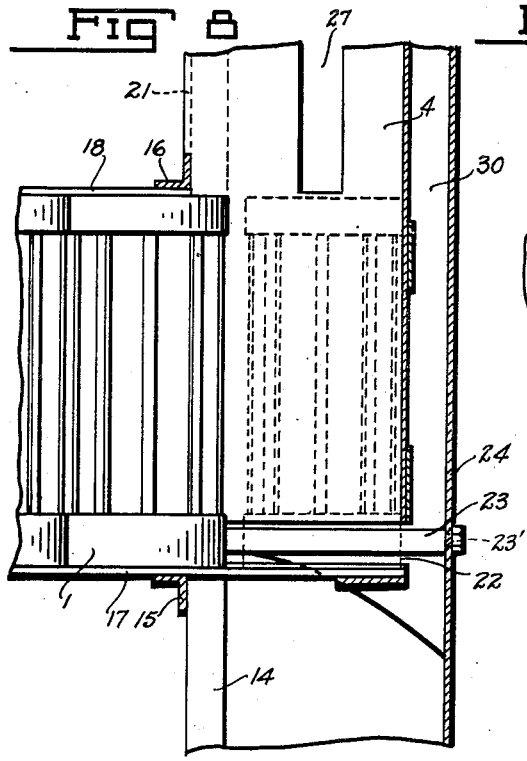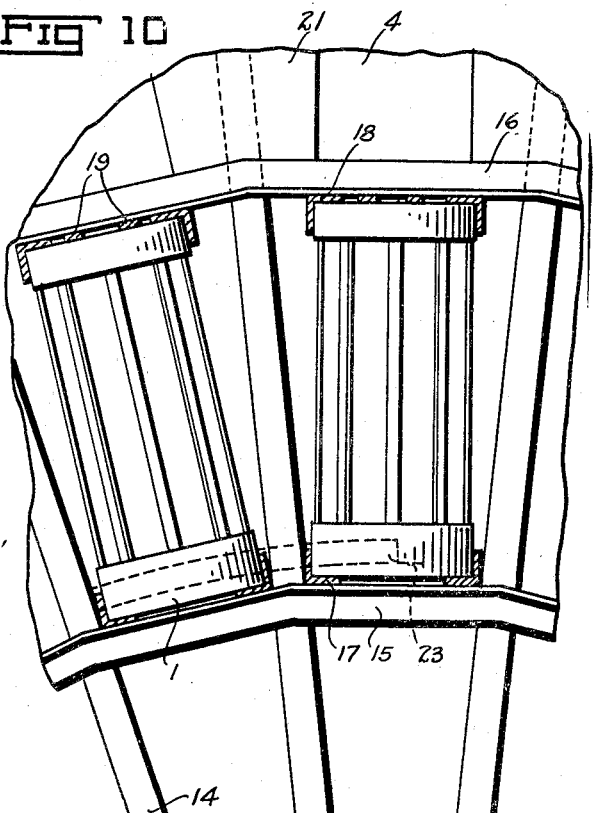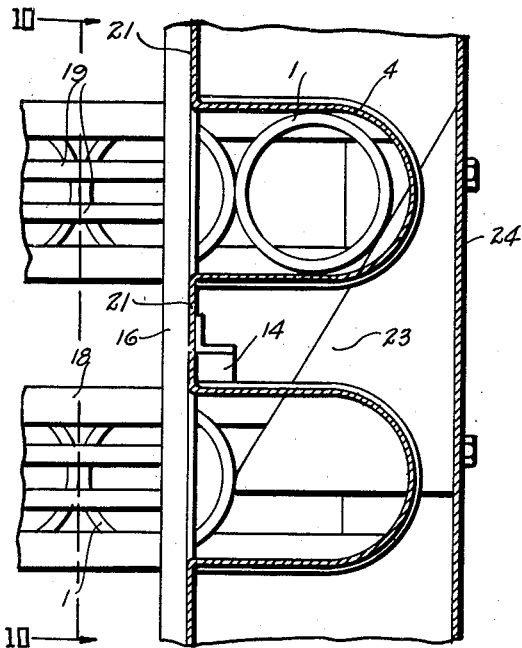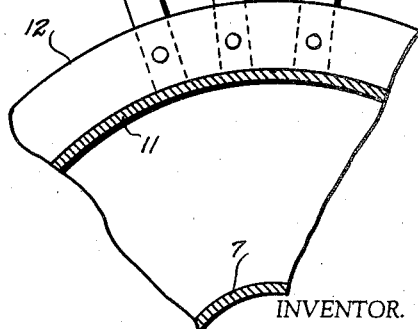
INVENTOR.
LAWRENCE A. LALLEMENT
BY Charles R. Werner
ATTORNEY.

Feb. 6, 1940.    L. A. LALLEMENT    2,189,586
BOTTLE WASHER AND STERILIZER
Filed April 16, 1936    9 Sheets-Sheet 6
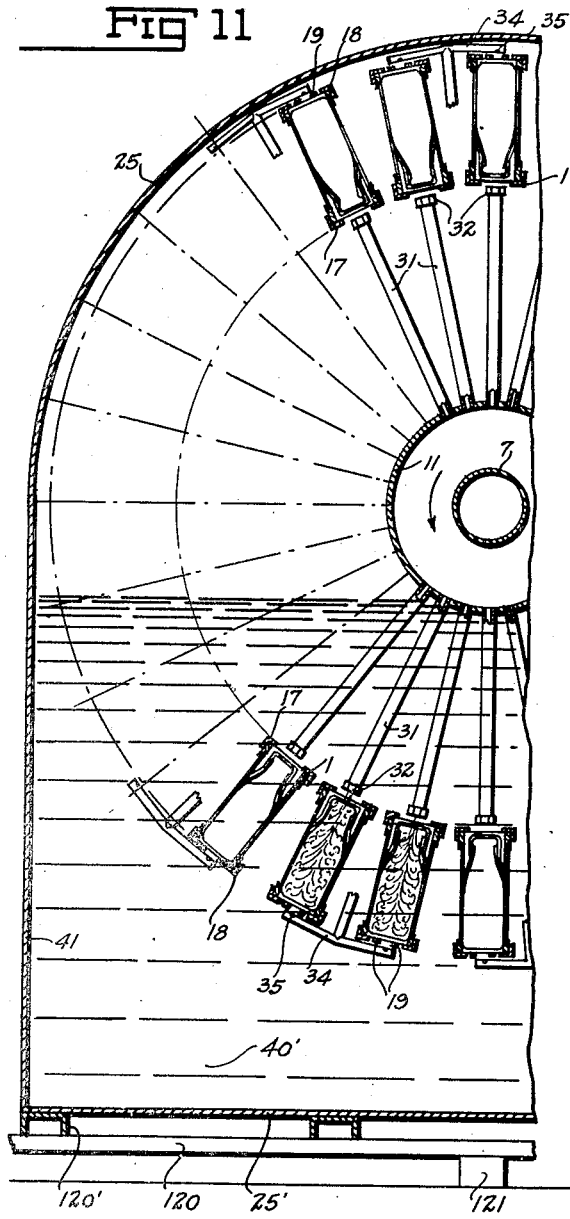
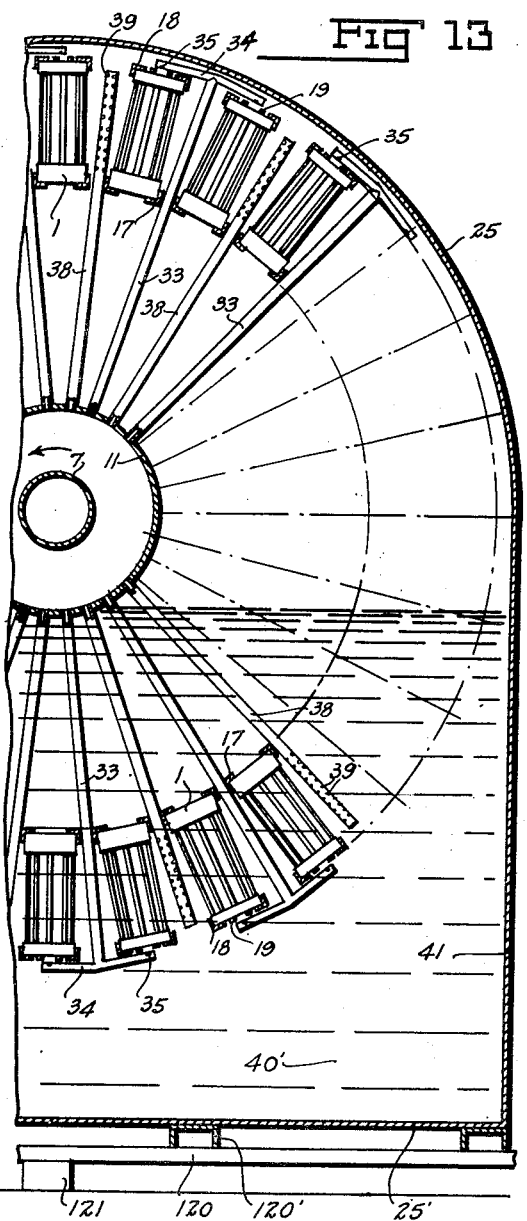
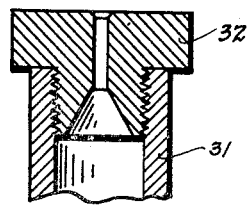
INVENTOR.
LAWRENCE A. LALLEMENT
BY Charles R. Werner
ATTORNEY.

Feb. 6, 1940. L. A. LALLEMENT 2,189,586
BOTTLE WASHER AND STERILIZER
Filed April 16, 1936 9 Sheets-Sheet 7
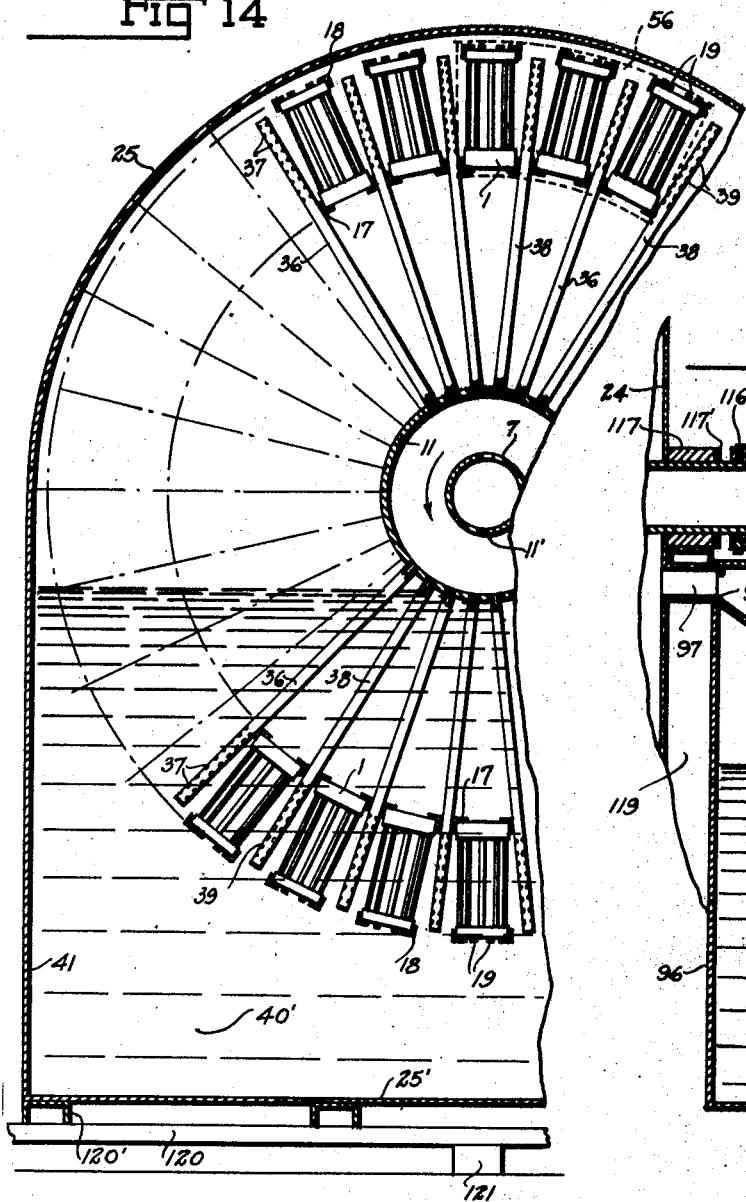
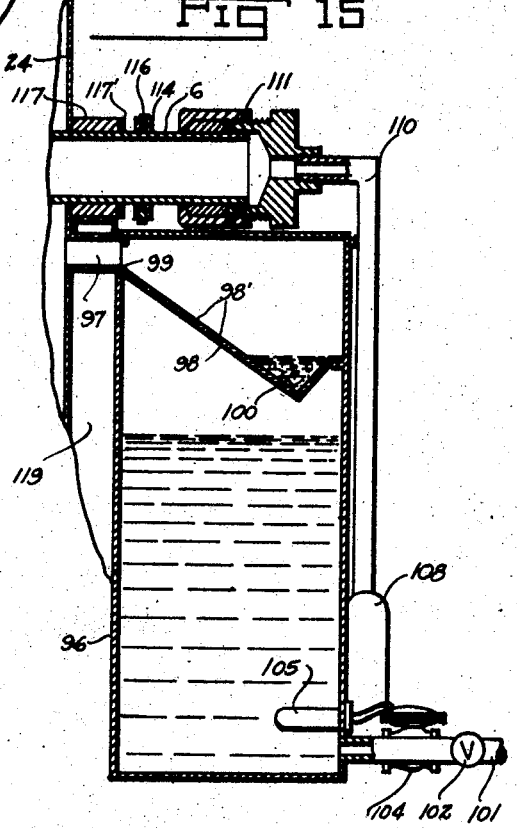
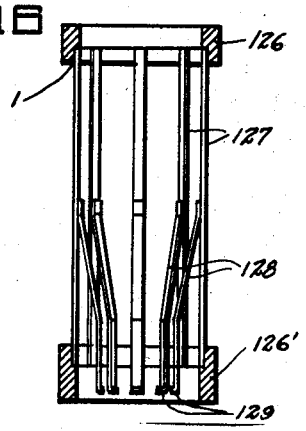
INVENTOR.
LAWRENCE A. LALLEMENT
BY Charles R. Werner
ATTORNEY.

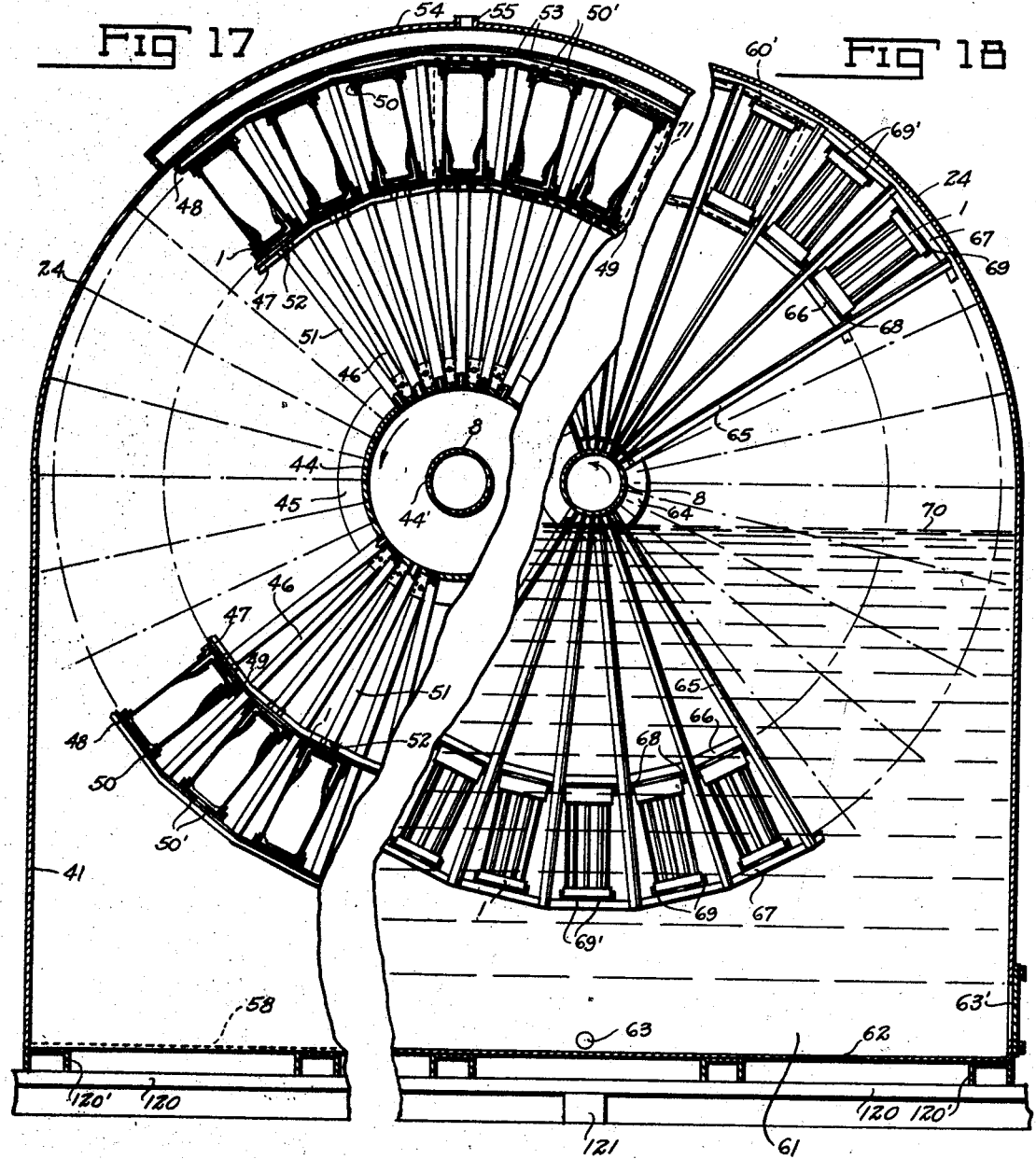

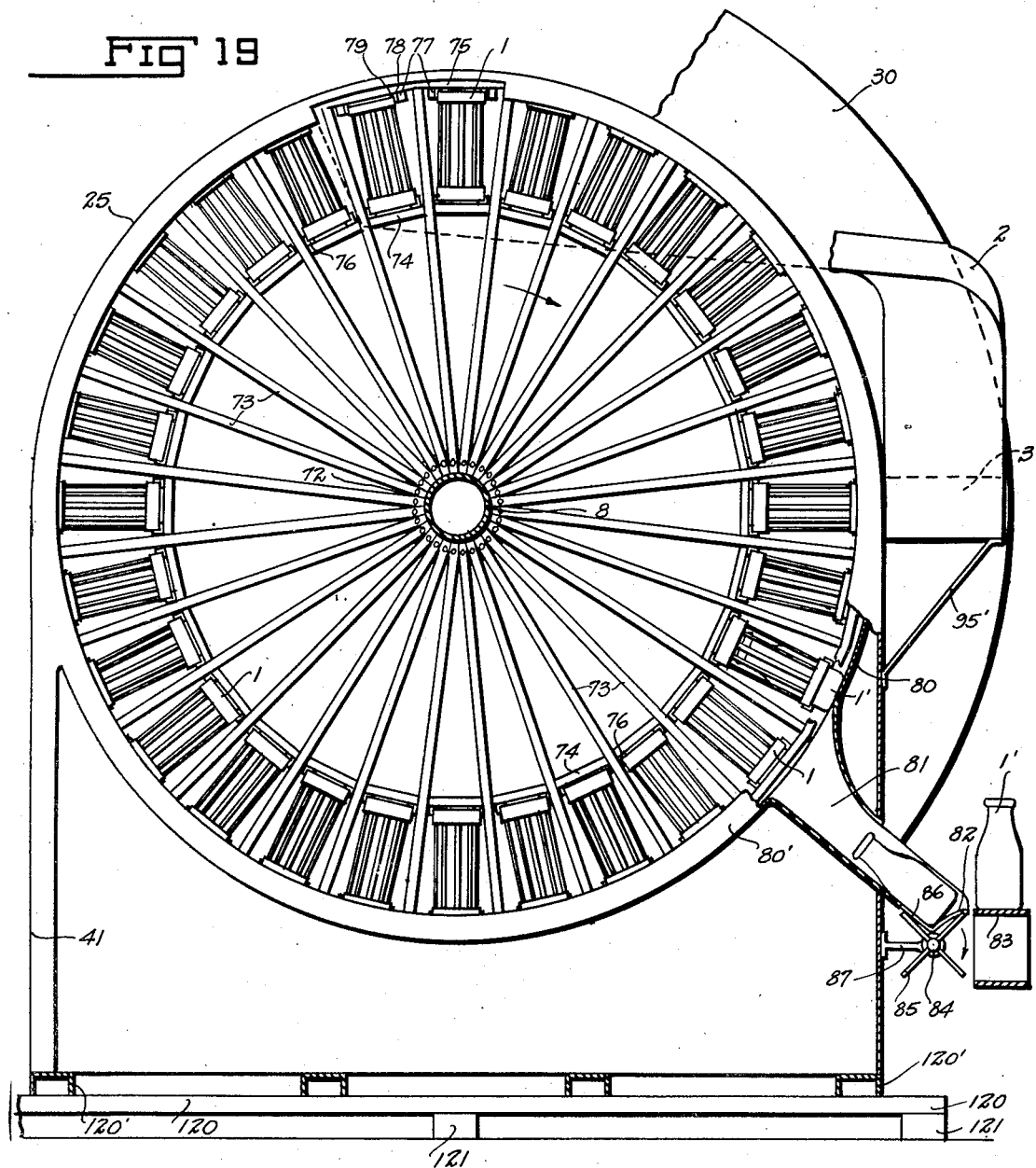

Patented Feb. 6, 1940

2,189,586

UNITED STATES PATENT OFFICE 2,189,586

BOTTLE WASHER AND STERILIZER

Lawrence A. Lallement, Wichita, Kans.

Application April 16, 1936, Serial No. 74,629

12 Claims. (Cl. 141—7)

This invention relates to bottle washing and sterilizing machines and particularly to that type of device in which bottles are placed in carriers which progress through washing, rinsing, cooling, sterilizing and discharge stations, the bottles being ejected from the carriers and the carriers being discharged onto a gravity feed chute to be returned to the starting or bottle receiving position.

The special type carriers employed in my machine are covered in application Serial No. 105,694, filed October 15, 1936, entitled "Bottle carriers," a continuation in part of this application.

The objects of the invention are, first; to provide a device of the class described in which individual, independent, detached carriers are employed for holding the bottles to be washed and sterilized.

Second; to provide a device of the class described employing pickup, washing, rinsing, cooling, sterilizing and discharge stations in which a plurality of tracks or carrier guides are longitudinally disposed and spaced from the longitudinal axis of the machine, and in which a plurality of sprays are provided for spraying the bottom, sides and interior of the bottles contained in the carriers riding on the tracks or guides.

Third; to provide a carrier pickup means which rotates the carriers and bottles therein through liquid in a tank for the preliminary washing and removal of foreign matter, and means for advancing the carriers through the succeeding stations at each revolution of the carrier pickup means.

Fourth; to provide means for washing the bottles whereby they are continuously sprayed on the bottom, sides and interior thereof while immersed in and when removed from the liquid in the washing tank.

Fifth; to provide means whereby each bottle will be intermittently soaked, washed and sprayed during its progress through the washing station, this process being repeated a number of times depending upon the length of the washing station.

Sixth; to provide a rinsing and cooling means whereby the bottles will be sprayed both inside and out with cool liquid to thoroughly rinse the bottles and lower the temperature thereof prior to immersion in the sterilizing liquid.

Seventh; to provide an ejector means which will allow the bottles to gravitate from the carriers and from which the carriers may be discharged onto a gravity chute leading to the starting or bottle receiving position.

Eighth; to provide in a device of the class described, an auxiliary tank to receive the overflow liquid from the washing tank, said liquid gravitating over a screen to clean the debris and foreign matter from the liquid, the cleansed liquid being pumped back into the washing station through the sprays.

Ninth; to provide in connection with the ejector, a bottle removing means which will advance the ejected bottle onto a conveyor which carries the cleansed and sterilized bottles to a bottling machine or the like.

Tenth; to provide a device of the class described in which a plurality of adjacent tanks and compartments are employed, comprising feeding, washing, rinsing, cooling, sterilizing and discharge stations, a hollow shaft passing longitudinally through the compartments and journaled at the ends thereof, means for supplying liquid to the hollow shaft, cylinders about the hollow shaft in certain compartments, openings between the cylinders and the interior of the shaft, a plurality of longitudinal tracks or carrier guides supported by the cylinders and the shaft and rotatable therewith, a plurality of spray members extending from and radially disposed about the cylinders and adapted to spray the bottom, sides and interior of the bottles in the carriers, means for intermittently advancing the carriers through the successive stations and means for ejecting the bottle from the carrier and for ejecting the carrier to a return chute.

Eleventh; to provide a device of the class described which will be relatively inexpensive to manufacture, simple in operation and construction due to the small number of moving parts and the employment of gravity feeding and discharge means, and which will require less installation space in relation to the output and capacity thereof.

The advantages of my invention are manifold. The provision of independent, detachable circular carriers permits the use of gravity feed or return of carriers, eliminating expensive and complicated conveyor mechanisms which usually employ chains, belts and pulleys and which are subject to stretching and misalignment, thereby requiring constant adjustment and care.

The novel construction of the carriers adapts them for use with various size bottles and the resilient bottle retaining members eliminate the danger of breaking bottles. The insertion of the bottles into the carriers is a very simple procedure due to the self-centering characteristics of the resilient retaining members. The use of individual carriers eliminates the contamination of the cleansing and sterilizing liquid by dirt, debris and foreign matter associated with bottle cases when such cases are placed in a bottle washing device.

The invention combines all the functions necessary in the proper washing and sterilizing of bottles into one assembly instead of separate units, eliminating the waste of time encountered in handling the bottles between operations and machines and greatly decreasing the cost of installation and upkeep of equipment as well as effecting a saving in operating space.

My bottle washing device permits the bottles to be thoroughly washed and sprayed both inside and out, not once, but a number of times during progress of the bottles through the machine. The sprays rotate with the bottles and therefore spraying of the bottles is continuous, that is, forceful streams of liquid are constantly being directed on the bottom, sides and interior of the bottles when they are immersed in the liquid in the tank and when they have emerged therefrom. I have found that this spraying agitates the liquid in and about the bottles during immersion thereof and washes them thoroughly, closely simulating the action of a brush thereon.

I have also found in actual practice that if a spray of liquid is directed into a bottle after said bottle has been immersed in liquid, practically no agitation is created inside the bottle since the force of the spray cannot overcome the inertia of the liquid in the bottle. However, I have found that if spraying is commenced before immersion of the bottle a certain amount of air is trapped in the bottle allowing the liquid to circulate freely therein, the action of the spray and the liquid in the bottle preventing the air from escaping, the pressure of the liquid surrounding the bottle being insufficient to disturb the spray. Therefore, as long as the spray is operating, the bottles will not fill with liquid and the rapid and effective circulation of the liquid in the bottle will not be impaired.

The liquid used for the washing spray is used over and over again, means being provided for cleansing the dirt and foreign matter therefrom. In many present day devices, the pump which forces the spray liquid into the machine draws its supply directly from the washing tank through a screen, consequently drawing considerable sediment and dirt with the liquid. This objectionable feature is eliminated in my invention due to the gravity cleaning of the overflow liquid from the washing tank and the supplying of liquid to the pump from an auxiliary tank which receives this filtered overflow liquid.

After a number of thorough washings and rinsings, the bottles are advanced to a rinsing and cooling station where they are subjected several times to sprays of cool, clean liquid directed both inside and outside the bottles to cool them before advancing to the sterilizing station where the bottles are rotated through a sterilizing solution and moved to the ejecting or discharge station where the bottles are allowed to gravitate from the carriers and the carriers are ejected to a gravity return chute, all in a simple and expeditious manner.

It is obvious that the principle of my invention may be carried out in various manners and forms and the description and drawings accompanying this application are merely illustrative of the preferred form of my invention as it occurs to me at the present time, it being understood that numerous mechanical expedients and changes in construction may be resorted to without departing from the spirit of the invention, and while the disclosure herewith presented is confined to the washing and sterilizing of milk bottles, it is obvious that the carriers may be changed to accommodate bottles or containers of other shapes or styles.

In the drawings:

Fig. 1 is a front elevational view of my invention.

Fig. 2 is a top plan view of the same.

Fig. 3 is an end view of the device looking at same from the carrier pickup end, showing the auxiliary tank and the motor, pump and drive assembly.

Fig. 4 is an end view of the device looking at same from the ejector end, showing the bottle removing mechanism and means for driving same.

Fig. 5 is a partial, vertical, longitudinal, sectional view through the machine.

Fig. 6 is a partial top plan view of the device with the tank cover removed.

Fig. 7 is a cross sectional view on the line 7—7 of Fig. 5 showing the carrier pickup station.

Fig. 8 is an enlarged, fragmentary, sectional view through a portion of the carrier pickup station and washing station showing the contact arm which advances the carriers through the machine.

Fig. 9 is a fragmentary top plan view of the same, parts being shown in section.

Fig. 10 is a fragmentary, elevational and sectional view on the line 10—10 of Fig. 9.

Fig. 11 is a partial, cross sectional view on the line 11—11 of Fig. 5 showing the sprays for the interior of the bottles.

Fig. 12 is a fragmentary cross sectional view through one of the spray nozzles.

Fig. 13 is a partial cross sectional view on the line 13—13 of Fig. 5 showing the sprays for the bottom of the bottles and sprays for the sides of the bottles.

Fig. 14 is a partial cross sectional view on the line 14—14 of Fig. 5 showing additional sprays for the sides of the bottles.

Fig. 15 is a vertical, sectional view through the auxiliary or pump supply tank and the portion of the washing tank to which it is connected.

Fig. 16 is a vertical cross sectional view through one of the bottle carriers used in combination with my washer and sterilizer.

Fig. 17 is a partial cross sectional view on the line 17—17 of Fig. 5 showing the rinsing and cooling station.

Fig. 18 is a partial cross sectional view on the line 18—18 of Fig. 5 showing the sterilizing station.

Fig. 19 is a cross sectional view and elevation on the line 19—19 of Fig. 5 showing the ejector or discharge station.

Referring now to the drawings by numerals of reference, 1 designates bottle carriers receivable on inclined runway or chute 2 terminating at opening 3 in the carrier pickup station which comprises a plurality of carrier troughs 4 radially disposed about the central axis of the device, through which passes a sectional hollow shaft 5 comprising bearing section 6, washer section 7 and rinser and cooler section 8, the washer section 7 being removably mounted to the other two sections, by means of flanges 9 suitably fastened together. (See Fig. 5.) Section 7 is sealed from section 8 by web or partition 10.

Mounted to and surrounding the hollow shaft section 7 is a cylindrical casing or distributing drum 11, having end flanges 12 from which radiate standards or supports 13 and 14. Transverse angles or braces 15 and 16 are secured to standards 13 and 14 and carry longitudinal rails or carrier tracks 17 and 18. Running parallel to the outer rails 18 are bottle retaining strips 19. Suitable transverse braces 20 may also be provided between the rails and secured to the retaining strips 19.

Between each carrier trough 4 is a web or connecting portion 21 to which the supports 14 may be secured. Each trough 4 is spaced from the rails or tracks 17, leaving an opening 22 allowing for passage of the carrier contact arm 23 which is secured to end wall 24 of housing 25. (See Figs. 8, 9 and 10.) The contact arm may be adjusted to change the point of contact with the carriers and to advance them more or less as desired, slots 23' being provided for this purpose.

The troughs 4 have closed outer ends 26 and a slot 27 is provided to clear the eccentric carrier positioning member 28 which is secured to the peripheral portion 29 of the carrier pickup housing 30.

Opening into and radiating from the cylindrical drum 11 are a plurality of spaced pipes or conduits 31 having spray nozzles or tips 32. These sprays are spaced at regular intervals along the distributing cylinder 11, adjacent each set of tracks and directly in line with the center of the carriers when they are normally positioned on the tracks during their progress through the machine so that a strong spray of liquid will be directed into each bottle. (See Fig. 11.)

A second set of pipes or conduits 33 also opening into the distributing drum 11 and radiating therefrom extend outward between each set of tracks and carry crossheads 34, the extremities of which have spray openings 35 positioned opposite nozzles 32 to spray the bottom of the bottles in the carriers. The conduits 33 are spaced at alternate intervals, intermediate conduits 36 being provided intermediate said conduits 33 longitudinally of the machine, and extending to the height of the outer tracks 18 between each set thereof and which have a plurality of spray openings 37 to direct liquid against the sides of the bottles in the carriers. (See Fig. 13.)

A third set of conduits 38 is also provided between each alternate row of tracks and spray openings 39 are provided in said conduits to direct liquid against the sides of the bottles. (See Fig. 14.)

This entire assembly of carrier troughs 4, tracks 17 and 18 and spray conduits 31, 33, 36 and 38 is adapted to rotate with the cylindrical drum 11 on the hollow shaft section 7, through liquid in a tank 40' formed of the end wall 24, bottom 25', partition 40 and housing sides 41. A suitable drain 42 may be provided as well as clean out plates 42' on diagonally opposite sides of the tank. The construction thus far described comprises the carrier pickup and washing stations.

The rinsing and cooling station located between tank partition 40 and partition 43 comprises a short cylindrical drum 44 positioned about the shaft section 8 and having end flanges 45 to which are mounted radiating standards or supports 46 carrying transverse angles or brackets 47 and 48 which carry the angular rail or track sections 49 and 50, said tracks being in alignment with the tracks 17 and 18 in the washing station. Bottle retaining strips 50' are provided, paralleling the outer tracks 50. (See Fig. 17.)

Opening into cylindrical drum 44 and radiating therefrom are spaced pipes or conduits 51 having spray tips 52 positioned so as to direct a strong spray of liquid into the bottles as they take their position directly opposite the sprays during the normal movement of the carriers on the tracks. The portion of the housing 25 above the rinsing and cooling station is provided with perforations 53 and a cover 54 having inlet or water connection 55 connected to a suitable source of liquid supply whereby a rinsing and cooling spray is provided for spraying the outside of the bottles in the carriers. An opening 56 is provided in the partition 40 between the washing station and the rinsing and cooling station for pasage of the carriers therethrough. No bottom has been provided in the rinsing and cooling station, the liquid passing off into a drain 57 provided in the floor below the device. However, if desired a tank bottom 58 and an outlet 59 may be provided for this purpose, outlet 59 being connected to a drainage system.

Between partitions 43 and 60 is located the sterilizing station, or tank 61 having bottom 62 provided with suitable drain 63 and clean out plate 63'. The hollow shaft section 8 carries a circular flange 64 which supports radiating standards 65 having transverse arms or brackets 66 and 67 carrying short track sections or rails 68 and 69, said tracks being in alignment with the tracks 49 and 50 in the rinsing and cooling station. Strips 69' paralleling the tracks 69 are provided for retaining the bottles in the carriers. No sprays are provided in this station, the bottles being rotated through the chlorine solution 70 several times before advancing to the next station. (See Fig. 18.) An opening 71 is provided in partition 43 for the passage of the carriers therethrough.

Partition 60 is provided with an opening 60' through which the carriers may advance to the ejecting or discharge station in which a flange 72 is secured to the hollow shaft section 8 and carries radiating supports 73 to which are secured transverse members 74 and 75, members 74 carrying tracks or rails 76 and members 75 carrying short angular members 77 which are secured to outer rail or track members 78. The edges 79 of the track members 78 are of sufficient width to retain the carriers on the tracks but which do not obstruct the bottles during ejection from the carriers. Side guide members 80' prevent the carriers from leaving the tracks until the carrier ejecting position is reached, and curved members 80 retain the bottles in the carriers until they are in alignment with the bottle receiving chute 81 at the bottom of which is a curved stop member 82 in close proximity to a conveyor belt 83 which is ordinarily used for feeding bottles to a bottling machine. (See Fig. 19.) The conveyor belt does not form a part of my invention and the ejected bottles may be deposited on any other type of distributing or carrier mechanism or on a table, platform or the like.

A spider 84 having fingers 85 passing through slots 86 in the ejector chute 81 and stop member 82 is provided for removing the ejected bottle from the chute to the conveyor belt 83. The spider 84 is suitably mounted in bearings 87 and rotated by means of gear 88, meshing with gear 89 on shaft 90 supported in bearings 91, the upper end of shaft 90 carrying gear 92 engaging gear 93 on hollow shaft section 8, whereby the spider 84 will be rotated when the shaft 8 is rotated, providing perfect timing for the removal of the bottles from the ejector chute concurrently with the deposit of bottles therein.

The upper end 94 of the inclined runway 2 is carried by suitable supports 95 and lies adjacent the point of ejection of the carriers so that the carriers will gravitate thereon. Additional chute supports 95' may also be provided.

At the carrier pickup end of the device is provided an auxiliary or overflow tank 96 connected to washing tank 40' by overflow conduits 97. (See Fig. 15.) A removable inclined screen or perforated member 98, having perforations 98', is positioned in the auxiliary tank 96 with its top edge 99 just below the overflows 97, its lower portion forming a trough 100 for retaining the foreign matter overflowing from the washing tank. Conduit 101 is connected to a suitable source of liquid supply controlled by shut-off valve 102, and conduit 103 leads from a source of steam supply and is valved by thermostat controlled valve 104 connected to suitable thermostat 105 positioned in tank 96 to maintain the liquid therein at a suitable temperature. An emergency shut-off valve 106 in steam line 103 may also be provided. Conduit 107 leads from tank 96 to a pump 108 of suitable construction which is rotatably connected to motor 109, a conduit 110 leading from the pump to the hollow shaft section 7, through suitable packing member 111.

The motor 109 is also adapted to rotate the hollow shaft 5 through a speed reducing member 112 of well known construction, pulleys 113 and 114, idler pulleys 115 and belt 116. The bearing section 6 of the hollow shaft 5 is suitably journaled in bearing 117 and the rinsing and cooling section 8 of the hollow shaft 5 is suitably journaled in bearing 118, flanges 117' and 118' on shaft 5 preventing longitudinal movement of said shaft.

The bearings 117 and 118 may be suitably supported by standards 119 secured to cross members 120 resting on legs or supports 121, the entire device being positioned in a pit 122. Additional transverse cross members 120 and legs 121 may be provided to carry the longitudinal rails or supports 120' upon which may rest the washing tank 40', sterilizing tank 61, auxiliary tank 96, pump 108 and the motor 109. The rinsing and cooling section 8 of the hollow shaft 5 has openings 44' opening into the cylindrical section or member 44 and the pipe section 8 is connected to a source of liquid supply through conduit 123 connected to reduced end 124 of shaft 8 through suitable packing means 125, a shut-off valve 123' being provided for controlling the flow of liquid.

The bottle carriers 1 comprise a pair of spaced rings 126 and 126' connected by separating strips 127 evenly spaced about the inner circumference of the rings. (See Fig. 16.) To these strips are fastened resilient fingers 128 converging toward the center of the carrier and terminating with detents 129 which retain the bottle in the carrier. Since the device has been constructed primarily for the washing and sterilizing of milk bottles the carriers have been so designed that either a quart, pint or half-pint bottle may be carried thereby and handled by the machine without change or adjustment. However, the carriers may be designed for use with other than milk bottles. If the bottle should leave its seat against the detents 129 due to pressure of the liquid or other cause, it will automatically gravitate thereon due to the self centering characteristics of the resilient fingers 128.

Prior to operating the washing and sterilizing machine, tank 40' is filled to a height level with the overflows 97 with a washing liquid which in actual practice I have found to be more effective when provided with 4% alkali in solution and heated to approximately 142° Fahrenheit. The auxiliary tank 96 is supplied with liquid through conduit 101 and the temperature of the liquid is maintained sufficiently high by steam entering through conduit 103 valved by thermostatically controlled valve 104 connected to thermostat 105 in the auxiliary tank, the temperature of the liquid when it reaches the washing tank after passing through the pump, conduits and sprays, being approximately 142° Fahrenheit.

The sterilizing tank 61 is supplied with a sterilizing liquid, preferably a solution of chlorine and water and the rinsing and cooling station is supplied with liquid by opening the valve 123'.

The tracks in all stations and the inclined chute 2 may be loaded to their capacity with empty carriers 1 and when the motor 109 is started the hollow shaft sections, cylindrical drums, tracks and supports and sprays in all stations will rotate simultaneously at a very slow rate of speed. The bottles 1' are inserted into the carriers just before they enter the pickup station, a portion 2' of the side wall of the inclined chute 2 being cut away for this purpose. When the carriers enter the carrier troughs 4 the ends 26 prevent the bottles from dropping out of the carriers which proceed downward into the wash liquid where the bottles are filled with liquid and any dirt and loose matter on the outside of the bottles is washed off.

As the carriers proceed upward the eccentric carrier positioning member 28 contacts the outer ring 126 of the carriers forcing the carriers gradually inward until they are resting on the tracks 17 at which time the liquid inside the bottles has gravitated back into the tank 40' at a point near the overflows 97, the soiled liquid and debris passing through the overflows 97 and across the perforated member 98, the liquid passing through the perforations 98' and the debris and foreign matter being trapped by the trough 100 which may readily be cleaned when desired by removal of the perforated member 98. The liquid passing through the perforations 98' is forced by the pump back into the washing station as will be hereinafter described.

The perforations 98' are preferably of less diameter than the openings in the spray tips 32, the openings 35 in the cross heads 34 and the spray openings 37 and 39 in the conduits 36 and 38, so that no sediment will pass through perforations 98' which cannot be discharged through openings in the spray tips and conduits in the washing station.

When a carrier 1 is approaching its uppermost position in the pickup station it contacts the carrier contact arm 23 which forces the carrier against the next carrier on the track which in turn is bearing against the adjacent carrier and so forth, to push all the carriers on the uppermost tracks in all stations one position ahead or the width of one carrier, the partitions 40, 43 and 60 serving as guides for the carriers which have just entered the respective stations.

When the carriers are moved out of the carrier troughs 4 the mouth of the bottles is positioned over spray nozzles 32 which direct a forceful stream of liquid into the interior of the bottles, the sides of the bottles being subjected to streams of liquid from spray conduits or pipes 36, 38 and a third stream of liquid is directed onto the bottom of the bottles from spray openings 35 in cross heads 34. The bottles in the washing station are being continuously sprayed on the interior, sides and bottom thereof during their entire passage through the washing station, with the exception of the last position before entering the rinsing and cooling station at which point the sprays are eliminated to prevent the washing liquid from entering the rinsing and cooling station through opening 56.

It has been found that the spray agitation of the alkaline solution in and about the submerged bottles greatly increases the washing and cleansing action and does not leave a coating of alkali usually resulting from a superficial washing. The liquid is supplied to the sprays through the distributing drum 11 which is connected to the interior of the hollow shaft 7 through openings 11', the liquid being pumped from the auxiliary tank 96 by pump 108 through conduits 107 and 110, web or partition 10 preventing the liquid from passing to rinsing and cooling section 8. I have found that the pump must exert a force on the liquid of approximately 30 to 40 pounds to produce the most effective spray.

As additional carriers are introduced into the pickup station the carriers on the tracks in the washing station will be advanced to the rinsing and cooling station through the opening 56 in the partition 40 onto the track members 49, the partition 40 forming a guide for positioning the carriers above the sprays 52 which send a stream of cool liquid into the interior of the bottles. The outside of the bottles will be rinsed and cooled by a spray passing through perforations 53 in the housing 25. The bottles are sprayed on the inside thereof continuously during rotation while the outside is sprayed only when adjacent the spray falling from above. The gravitating liquid will be carried away by drain 57. The bottles now being thoroughly rinsed and cooled are advanced through opening 71 in partition 43 to the tracks 68 in the sterilizing station, where the carriers and bottles therein are rotated several times through a chlorine sterilizing solution. The cooling of the bottles in the previous station will prolong the life of the chlorine solution.

From the sterilizing station the carriers pass through openings 60' to the ejecting or discharge station and as the tracks rotate downwardly the bottles gravitate from the carriers and bear against retainer 80 until the bottle receiving chute 81 is reached at which time the bottle is freed, moving downwardly to the stop member 82. The bottle is immediately removed from the receiving chute by fingers 85 which pass through slots 86 in the chute and force the bottle onto conveyor belt 83 or to any other suitable distributing means.

The carriers relieved of the bottles continue rotating with the tracks until they reach an approximate vertical position when they are forced off the track by the succeeding carriers in the previous station. The discharged carriers are received by the inclined runway 2 which is loaded with carriers moving slowly toward the feeding point. The cylindrical shape of the carriers will allow them to roll forward slowly as the loaded carriers enter the carrier receiving troughs.

From the foregoing it will be apparent that I have provided a washing and sterilizing device which will receive the soiled bottles, wash them thoroughly by a repetition of washing, soaking and rinsing operations, the bottles being continuously subjected to a strong spray, inside and out, during immersion and after emerging from the washing liquid, rinsing and cooling the bottles several times with fresh cool liquid, sterilizing the bottles by immersion in a suitable sterilizing liquid, and ejecting the bottles from the carriers and ejecting the carriers onto an inclined runway returning said carriers to the starting or bottle receiving position. The moving belts, racks, conveyors and pulleys which are used in present day devices have been entirely eliminated in my invention, removing the attendant maintenance and adjustment drawbacks. In my invention there are comparatively few moving parts and therefore very little deterioration, making for long and efficient operating life.

What I claim as new and desire to secure by Letters Patent is:

1. In a washing and sterilizing device, a rotary guide member, columns of abutting individual carriers on the guide member, each carrier being adapted to retain a single article to be washed, a plurality of sprayers rotatable with and disposed along the guide member on two or more sides of the columns of carriers and adapted to spray liquid in and about the articles retained by the carriers, and carrier advancing means adapted to simultaneously advance the columns of carriers along the guide member during rotation of said rotary guide member.

2. A washing and sterilizing device having a central longitudinal axis, carrier guides axially disposed and rotatable about the central longitudinal axis of the device, individual carriers slidably positioned on the guides and adapted to receive articles to be washed, spray means adjacent the carriers and adapted to spray liquid in and about the articles in the carriers continuously during rotation of said carrier guides, carrier pickup means adapted to introduce the carriers onto the guides, advancing means adapted to move the carriers along the guides during rotation thereof, means whereby the articles may gravitate from the carriers, said advancing means being adapted to eject the carriers from the guides.

3. The structure as specified in claim 2, including carrier return means for returning the empty carrier to a loading position prior to entrance of said carrier into the carrier pickup means.

4. The combination, in a washing and sterilizing device, of a plurality of compartments, a central hollow shaft comprising a plurality of non-intercommunicating liquid conductors passing through the compartments, a plurality of aligning guides in the compartments, said guides being axially disposed about and rotatable with said hollow shaft, article retaining carriers receivable by said guides, a plurality of sprays disposed adjacent and interposed between the guides, rotatable therewith and adapted to continuously spray the articles retained by the carriers during rotation of said guides, certain of said sprays communicating with certain of said liquid conductors, carrier pickup means rotatable with said hollow shaft and adapted to receive and introduce said carriers onto said guides, carrier advancing means for progressing said carriers along the guides and from compartment to compartment during rotation of said guides, an ejecting station adapted to receive the carriers containing the washed and sterilized articles, said ejecting station being adapted to discharge the articles from the carriers, said carrier advancing means being adapted to discharge the carriers from the ejecting station, and a return chute for receiving and directing the discharged carriers back to the carrier pickup means.

5. In a washing and sterilizing device, a rotatable guide member, columns of abutting carriers on the rotatable guide member, each carrier being adapted to carry a separate article to be washed, a plurality of sprayers rotatable with and disposed along the guide member on two or more sides of each column of carriers thereon to spray liquid in and about the articles in the carriers, and means adapted to abut the end carrier of each column for simultaneously advancing an entire column of carriers along the guide member during rotation of said guide member.

6. In a washing and sterilizing device, a central hollow shaft, a plurality of guides disposed about said shaft, columns of abutting carriers on the guides, each carrier being adapted to carry a separate article to be washed, a plurality of sprayers communicating with the hollow shaft and disposed along the guides on two or more sides thereof, said spray means being adapted to spray liquid in and about the articles in the carriers, said guides and sprayers being rotatable with said hollow shaft, and means in the path of the end carrier of each column for simultaneously advancing an entire column of carriers along the guides.

7. In a washing and sterilizing device, a washing tank containing a liquid, rotatable supporting means positioned in the tank, columns of abutting carriers on the supporting means, each carrier being adapted to carry a separate article to be washed, rotatable spray means disposed along the columns of carriers on two or more sides thereof and adapted to spray said articles in the carriers, inside and out, during immersion in the liquid and when emerged therefrom, and means in the path of the end carrier of each column for simultaneously advancing an entire column of carriers along the rotatable supporting means.

8. In a washing and sterilizing device, a plurality of guides, columns of abutting carriers on the guides, each carrier being adapted to carry a separate article to be washed, a plurality of sprayers disposed along the guides on two or more sides thereof to spray liquid in and about the articles in the carriers, means for introducing carriers onto the guides, and means adapted to abut the end carrier of each column for simultaneously advancing an entire column of carriers and ejecting a carrier on the other end of the advancing column.

9. A device of the class described, including a rotary supporting means, a plurality of columns of abutting individual carriers on the rotary means, each carrier being adapted to loosely carry a single article to be washed, spray means rotatable with the supporting means, and means for simultaneously advancing an entire column of carriers on the rotary means during rotation of the rotary supporting means.

10. A device of the class described, including a rotary supporting means, a plurality of columns of abutting carriers on the rotary means, each carrier being adapted to loosely carry a single article to be washed, means for introducing the articles to the carriers, means for introducing the carriers to the rotary means, means for spraying the articles in the carriers, and means for simultaneously advancing an entire column of carriers on the rotary means.

11. A device of the class described, including a rotary supporting means, a plurality of columns of abutting individual carriers on the rotary means, each carrier being adapted to loosely carry a single article to be washed, means for introducing the articles to the carriers, means for introducing the carriers to the rotary means, means for spraying the articles in the carriers, means for simultaneously advancing an entire column of carriers on the rotary means, means for ejecting the articles from the carriers, said carrier advancing means being adapted to eject the carriers from the rotary means after the articles have been ejected from the carriers.

12. A device of the class descibed, including a rotary supporting means, a plurality of columns of abutting individual carriers on the rotary means, means for introducing the carriers to the rotary means, means for spraying the articles in the carriers, means for simultaneously advancing an entire column of carriers on the rotary means, said carrier advancing means being adapted to eject the carriers from the rotary means, and means for conveying the ejected carriers to the carrier introducing means.

LAWRENCE A. LALLEMENT.